US012578188B2

(12) United States Patent
Notheis et al.

(10) Patent No.:  US 12,578,188 B2
(45) Date of Patent:       Mar. 17, 2026

(54) CALIBRATION APPARATUS, PROCESSING SYSTEM AND CALIBRATION METHOD

(71) Applicant: TRUMPF Laser GmbH, Schramberg (DE)

(72) Inventors: Thomas Notheis, Schramberg (DE); Martin Stambke, Dunningen (DE); Patrick Ehrmann, Schramberg-Sulgen (DE); Klemens Schmitt, Schramberg (DE)

(73) Assignee: TRUMPF LASER SE, Schramberg (DE)

( * ) Notice:  Subject to any disclaimer, the term of this patent is extended or adjusted under 35 U.S.C. 154(b) by 287 days.

(21) Appl. No.: 18/296,377

(22) Filed: Apr. 6, 2023

(65) Prior Publication Data

US 2023/0243647 A1      Aug. 3, 2023

Related U.S. Application Data

(63) Continuation of application No. PCT/EP2021/077695, filed on Oct. 7, 2021.

(30) Foreign Application Priority Data

Oct. 12, 2020    (DE) ..................... 10 2020 212 847.2

(51) Int. Cl.
*G01B 21/04*          (2006.01)
*B23K 26/70*          (2014.01)
*B23K 26/38*          (2014.01)

(52) U.S. Cl.
CPC .......... *G01B 21/042* (2013.01); *B23K 26/705* (2015.10); *B23K 26/38* (2013.01)

(58) Field of Classification Search
CPC ..... G01B 21/042; B23K 26/705; B23K 26/38
See application file for complete search history.

(56) References Cited

U.S. PATENT DOCUMENTS

| | | | | |
|---|---|---|---|---|
| 4,540,277 | A * | 9/1985 | Mayer | G03F 9/70 |
| | | | | 355/53 |
| 5,859,707 | A * | 1/1999 | Nakagawa | G03F 9/7065 |
| | | | | 356/399 |
| 6,062,948 | A | 5/2000 | Schiff et al. | |
| 6,226,074 | B1 * | 5/2001 | Fujisawa | G03F 7/70633 |
| | | | | 430/311 |
| 7,256,868 | B2 * | 8/2007 | Akamatsu | G03F 7/70341 |
| | | | | 355/53 |
| 8,803,073 | B2 | 8/2014 | Philippi | |
| 2003/0021603 | A1 | 1/2003 | Engel | |
| 2010/0208230 | A1 | 8/2010 | Rath et al. | |

(Continued)

FOREIGN PATENT DOCUMENTS

| | | | |
|---|---|---|---|
| CN | 106553338 A | | 4/2017 |
| DE | 102004043072 A1 | | 4/2005 |

(Continued)

*Primary Examiner* — Rebecca C Bryant
(74) *Attorney, Agent, or Firm* — LEYDIG, VOIT & MAYER, LTD.

(57)              ABSTRACT

A calibration apparatus for a processing system with a plurality of optical tools is provided. The calibration apparatus includes a housing with a stop aperture, a sensor arrangement for capturing light that is incident through the stop aperture, and a light source arrangement for emitting light through the stop aperture.

16 Claims, 5 Drawing Sheets

(Section B-B)

(56)         References Cited

U.S. PATENT DOCUMENTS

| | | | |
|---|---|---|---|
| 2013/0178972 A1 | 7/2013 | Goldsmith et al. | |
| 2014/0027421 A1 | 1/2014 | Notheis | |
| 2015/0100149 A1 | 4/2015 | Coeck et al. | |
| 2015/0305937 A1 | 10/2015 | Goos et al. | |
| 2020/0174353 A1* | 6/2020 | Grunwald | G03B 21/204 |
| 2020/0254561 A1 | 8/2020 | Blázquez-Sánchez | |
| 2022/0016730 A1 | 1/2022 | Stambke et al. | |

FOREIGN PATENT DOCUMENTS

| | | | |
|---|---|---|---|
| DE | 102009009062 A1 | 9/2010 |
| DE | 102011006553 A1 | 10/2012 |
| DE | 102015012565 B3 | 10/2016 |
| DE | 102016106648 A1 | 10/2017 |
| DE | 102018000887 A1 | 8/2019 |
| DE | 102018219129 B3 | 11/2019 |
| EP | 3527319 A1 | 8/2019 |
| JP | 2008264789 A | 11/2008 |

* cited by examiner (Section A-A)

(Section B-B)

CALIBRATION APPARATUS, PROCESSING SYSTEM AND CALIBRATION METHOD

CROSS REFERENCE TO RELATED APPLICATIONS

This application is a continuation of International Application No. PCT/EP2021/077695 (WO 2022/078866 A1), filed on Oct. 7, 2021, and claims benefit to German Patent Application No. DE 10 2020 212 847.2, filed on Oct. 12, 2020. The aforementioned applications are hereby incorporated by reference herein.

FIELD

Embodiments of the present invention relate to a calibration apparatus for a processing system with a plurality of optical tools. Embodiments of the present invention furthermore relate to a method for calibrating a processing system with a plurality of optical tools and to a processing system with a plurality of optical tools.

BACKGROUND

Modern machine tools with optical tools, in particular laser cutting machines, frequently have additional optical tools, in addition to the actual processing tool. The additional optical tools can be used for example to support the processing tool and/or for quality assurance purposes. This improves the processing process carried out using the machine tools.

In order to be able to more precisely use optical tools during processing, the optical tools must be calibrated in respect of their focal positions. For this purpose, it is generally known to calibrate the optical tools separately from one another, and to this end a separate calibration means can be used for each optical tool.

DE 10 2004 043 072 A1 discloses an apparatus for processing using a laser beam. The apparatus has a laser head that is movable in relation to at least one workpiece, an optical arrangement for aligning and focusing the laser beam at an effective zone, and at least one camera that is arranged at the laser head and is aimed at the effective zone. The laser head is positionable in a spatially fixed calibration station, wherein the calibration station contains a calibration object in the effective zone. The calibration station consists of a planar plate. A fixed pattern and tracks are situated on the surface of the plate. The pattern can be formed by self-luminous elements so it may be more easily perceived. Self-luminous elements provided can be light-emitting diodes that sit in depressions in the surface of the plate and are each covered with a diffuser panel. A device for beam measurement is integrated at the centre of the plate. To this end, photo receivers arranged in the form of a matrix are provided in the surface.

DE 10 2018 219 129 B3 discloses a method for determining translational and/or rotational deviations between the measurement coordinate system of a measurement mirror scanner, which is tiltable about two axes and two-dimensionally diverts a measurement beam that is generated for example by a coherence tomography machine, and the processing coordinate system of a processing mirror scanner, which is tiltable about two axes and two-dimensionally diverts both the measurement beam diverted by the measurement mirror scanner and also a processing beam onto a workpiece, wherein the measurement beam reflected at the workpiece returns along the path of the incident measurement beam and is detected by a spatially resolving measurement sensor in order to ascertain spatially resolving information relating to the workpiece, and wherein, in a zero position of the measurement mirror scanner, the reflected measurement beam is imaged in the sensor image of the measurement sensor at a previously known image position. To determine a translational deviation between the processing coordinate system and the measurement coordinate system, an x-y focal position deviation of the processing beam in relation to the pinhole stop centre of a pinhole stop detector arranged on the workpiece support plane is ascertained. This is done by scanning the pinhole stop with the processing beam diverted by the processing mirror scanner in an x-y grid and by evaluating the laser output detected in each of the grid points by a detector surface arranged downstream of the pinhole stop. The processing mirror scanner is then fixed in the scanning position in which the focal position of the processing beam is situated exactly at the pinhole stop centre and which has been corrected using the ascertained x-y focal position deviation. With the processing mirror scanner being fixed in this way, the height of the pinhole stop is captured in a spatially resolving manner by means of the measurement sensor by scanning the pinhole stop with the measurement beam diverted by the measurement mirror scanner. Using the deviation that is present in the sensor image of the measurement sensor, between the previously known image position corresponding to the focal position of the processing beam and the pinhole stop centre of the pinhole stop that has been captured in terms of its height, a translational deviation $\Delta x$, $\Delta y$ between the processing coordinate system and the measurement coordinate system can be determined.

SUMMARY

Embodiments of the present invention provide a calibration apparatus for a processing system with a plurality of optical tools. The calibration apparatus includes a housing with a stop aperture, a sensor arrangement for capturing light that is incident through the stop aperture, and a light source arrangement for emitting light through the stop aperture.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
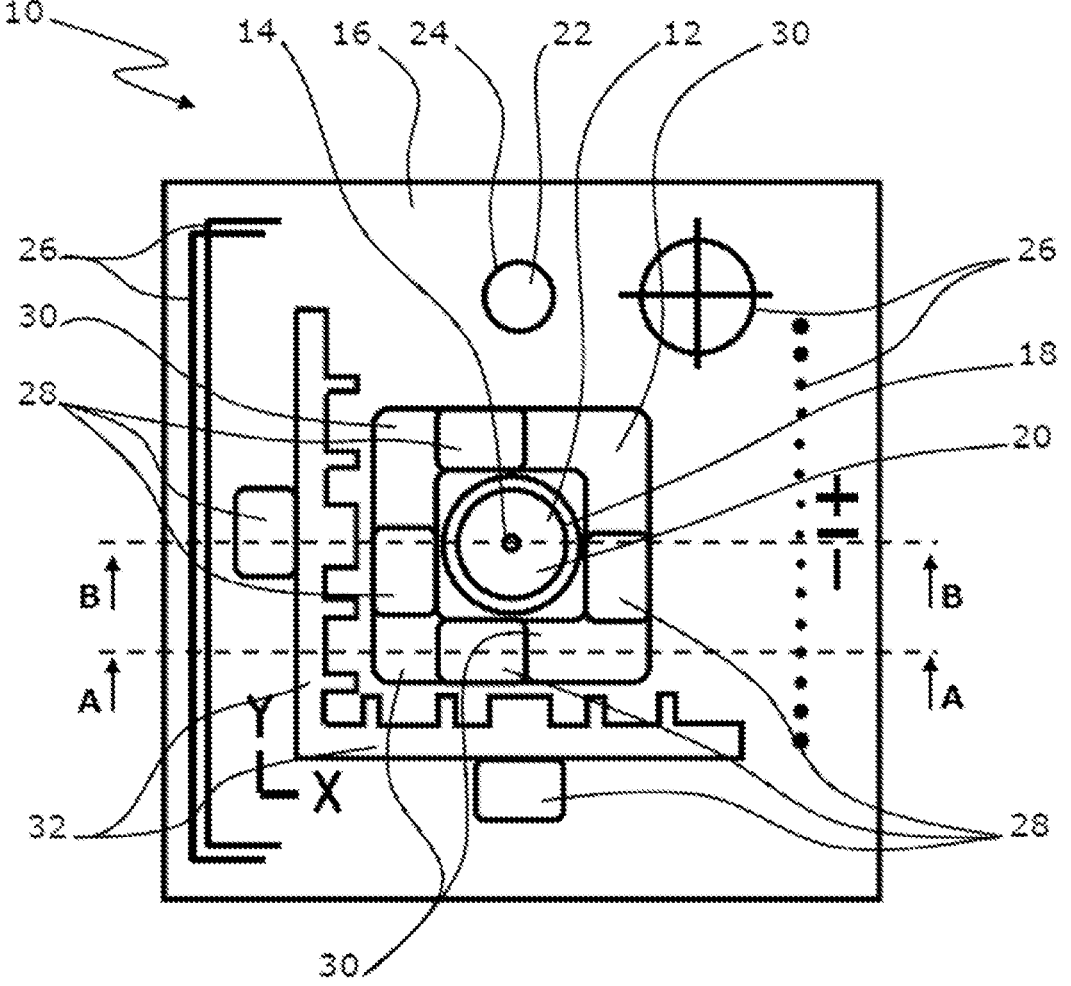
FIG. 1 shows a calibration apparatus with a housing and a test plate in a schematic top view according to some embodiments.

Embodiments of the present invention can enable simple and precise calibration of a plurality of optical tools of a processing system in relation to one another.

Calibration Apparatus

Embodiments of the present invention provide a calibration apparatus for a processing system with a plurality of optical tools. The calibration apparatus has a housing with a stop aperture, a sensor arrangement for capturing light that is incident through the stop aperture and a light source arrangement for emitting light through the stop aperture.

The calibration apparatus serves for calibrating the optical tools to a common focal position. For calibrating the focal position ("focusing"), initially an actual focal position of a focal point of the respective optical tool may be captured. Next, the focal point is set in accordance with the stop aperture. In particular, the respective optical tool can be transitioned from a non-calibrated state into a calibrated state by "adjusting the sharpness" of the stop aperture. In principle, a plurality of, with particular preference all of, the optical tools of the processing system are calibrated using the same calibration apparatus. Using the calibration apparatus according to embodiments of the invention for calibrating a plurality of, or all of, the optical tools of the processing system makes it possible to carry out the calibration particularly quickly and easily, unlike when using separate devices for calibrating the individual optical tools. Furthermore, the matching of the focal positions of the optical tools is improved by the common reference position (which is defined by the stop aperture).

The sensor arrangement has at least one sensor. The sensor arrangement is configured for indirectly or directly capturing a light intensity of the incident light. For this purpose, the sensor arrangement can be configured for capturing a temperature and/or a brightness. By capturing the light intensity it is possible to draw conclusions about the light that is incident through the stop aperture. If the light that is emitted by a light-emitting optical tool is known, then it is possible by capturing the light that is incident through the stop aperture to draw conclusions relating to the focal position of the light-emitting optical tool with reference to the stop aperture. For example, the focal position corresponds to the position of the stop aperture (i.e. the focal point lies in the stop aperture) if the captured light corresponds to the light that was emitted by the optical tool.

The light source arrangement serves for illuminating the stop aperture of the calibration apparatus. In other words, the stop aperture is highlighted by radiating light emitted by the light source arrangement. Using the light radiated through the stop aperture, the focal position of a light-detecting optical tool can be calibrated. Provision may be made here for the light source arrangement to emit light having a defined wavelength that can be detected by the optical tool to be calibrated. In particular, the light source arrangement can be configured for emitting light of different wavelengths. In this way, the highlighting of the stop aperture by illuminating it with light of a specific wavelength can be adapted specifically to different optical tools to be calibrated.

The term "light" in the present context is understood to mean electromagnetic radiation, in particular having a wavelength of at least 10 nm and/or at most 1 mm.

With the exception of the stop aperture, the housing is preferably closed off on all sides. This prevents dirt from penetrating the housing. The housing is typically formed from multiple parts. This simplifies the arrangement and/or the exchange of components, for example during production and/or repair of the calibration apparatus.

In principle, the light source arrangement and sensor arrangement are arranged in the housing. In this way, incident light can be captured by the sensor arrangement under defined conditions. Likewise, light can be emitted from the light source arrangement through the stop aperture under defined conditions. Interfering factors for the calibration, such as ambient light, are hereby minimized. This increases the accuracy of the calibration.

Preferred is an embodiment in which the calibration apparatus has a circuit board that is arranged in the housing and on which the light source arrangement and/or the sensor arrangement are held. It is thus advantageously possible to arrange the electronic components (circuit board, sensor arrangement, light source arrangement) in just one manufacturing step and to arrange the circuit board in the housing in just one further manufacturing step.

The circuit board is preferably arranged parallel to a stop having the stop aperture. In other words, the circuit board can be arranged orthogonally to a stop axis of the stop aperture. This prevents optical distortions. The circuit board is preferably held clamped in the housing, in particular between two housing parts which are detachable from each other. In this way, the position of the circuit board in the housing can be effectively secured.

Provision is made according to one preferred development of this embodiment for the sensor arrangement to be arranged on a side of the circuit board facing away from the stop aperture. A light-guiding structure is provided to guide the light incident through the stop aperture to the sensor arrangement. In other words, the circuit board serves as light protection for the sensor arrangement. In this way, the sensor arrangement can be protected against direct illumination by the incident light. This effectively prevents damage to the sensor arrangement. Irrespective of the light-protected location of the sensor arrangement, the light-guiding structure enables the capturing of the light that is incident through the stop aperture.

The light-guiding structure preferably has a reduced light transmission in order to reduce the light intensity of the incident light. The light-guiding structure preferably has a light-transmission of at most 90 percent, with particular preference of at most 75 percent, with very particular preference of at most 50 percent. With further preference, the light-guiding structure has a light-transmission of at least 10 percent, with particular preference of at least 20 percent, with very particular preference of at least 40 percent. Owing to the light-guiding structure, the light intensity of the incident light can thus be reduced to a degree that is suitable for capturing it by way of the sensor arrangement.

Of particular preference is a further development, in which the light-guiding structure has a light-transmissive sleeve, in particular a PET (polyethylene terephthalate) sleeve, by means of which the circuit board is held in the housing. The sleeve thus serves both for guiding the light and also for holding the circuit board. The light-guiding structure can preferably be formed by the light-transmissive sleeve. The light-guiding function can therefore be particularly advantageously performed by only one light-guiding structure. The light-transmissive sleeve typically extends on the side of the circuit board facing the stop aperture and/or facing away from the stop aperture. This simplifies the coupling of light into and/or out of the light-guiding structure. For holding the circuit board in the housing, the light-transmissive sleeve can grip the periphery of the circuit board. In other words, the light-transmissive sleeve is arranged between the periphery of the circuit board and a wall of the housing. In this way, incident light can reach the sensor arrangement only via the light-guiding structure, as a result of which the accuracy can be further increased.

In a preferred further development, the calibration apparatus has an optical element, arranged between the stop aperture and the circuit board, for redirecting light that is incident through the stop aperture. In particular, the optical element diverts light that is incident along a stop axis away from the stop axis. In this way, the incident light can be advantageously redirected towards the light-guiding structure, which further improves the light guidance to the sensor arrangement. The optical element in principle allows light emitted by the light source arrangement to exit through the stop aperture.

In a preferred embodiment of the calibration apparatus, the sensor arrangement has at least one photodiode and/or at least one temperature sensor. The light incident through the stop aperture can be captured here directly by measuring the light intensity and/or indirectly by measuring a temperature increase in the housing. The photodiode can capture the intensity of in particular visible light.

The light source arrangement is preferably arranged within close proximity of the stop aperture. In this way, energy-efficient emission of light through the stop aperture is made possible.

In a particular configuration, the optical element is configured for diverting light, emitted by the light source arrangement, in the direction of the stop aperture. This further improves the emission of light through the stop aperture. In this case, the optical element fulfils a dual function. First, light emitted by the light source arrangement is focused onto the stop aperture and, second, light that is incident through the stop aperture is scattered, or directed past the light source arrangement. In this way, the light source arrangement can be protected against the incident light and yet effective lighting of the stop aperture is made possible.

Further preferred is an embodiment in which the light source arrangement has at least one first light source, in particular a light-emitting diode, for emitting light having a wavelength of at least 760 nm, preferably at least 1100 nm, with particular preference at least 1500 nm, and preferably at most 2000 nm, particularly preferably at most 1600 nm. This enables the detection of the stop aperture using optical tools based on infrared light, for example pyrometers, thermal cameras, etc.

In a further development, the first light source is arranged on a stop axis of the stop aperture. This aids in the direct emission of light through the stop aperture with uniform lighting of the stop aperture.

Also preferred is an embodiment in which the light source arrangement has at least one second light source, in particular a light-emitting diode, for emitting light having a wavelength of at most 760 nm, particularly preferably at most 650 nm, and preferably at least 610 nm, particularly preferably at least 640 nm. This enables the detection of the stop aperture using optical tools based on red light, for example distance measurement apparatuses, seam position control apparatuses, etc.

The at least one second light source is preferably arranged at a distance from the stop axis. This enables the arrangement of the first light source on the stop axis. Typically, the light source arrangement has a plurality of, in particular at least two, particularly preferably at least three, second light sources. The plurality of second light sources are preferably arranged distributed uniformly around the stop aperture. This enables uniform lighting of the stop aperture.

In a preferred embodiment, the calibration apparatus has a test plate extending orthogonally to a stop axis of the stop aperture. The test plate serves for calibrating a common orientation of the optical tools. The common orientation can be characterized by matching coordinate systems of the optical tools and/or by predefined relationships of the coordinate systems. In the calibrated state, optical axes of the optical tools can run parallel to one another. The extent of the test plate orthogonal to the stop axis simplifies the calibration of the orientation.

The test plate is preferably made from metal, in particular aluminium. This is advantageous with respect to the stability, in particular strength and/or stiffness, of the test plate.

Provision is made according to one preferred development of the calibration apparatus for the test plate to have a surface that is at least regionally coated, preferably eloxated. The coating can protect the surface of the test plate. The coating can furthermore support the calibration of the optical tools, for example by way of its colour or colour differences.

Furthermore preferred is a further development in which the test plate has defined surface structures for calibrating the optical tools. The surface structures differ from the remaining surface of the test plate. Except for the surface structures, the entire remaining surface of the test plate may be coated. The surface structures can have, for example, colour, geometry, height and/or roughness differences compared with the surrounding area. In particular, surface structures can be in the form of recesses or cutouts (pockets), protrusions, markers and/or scales. This list is merely exemplary in nature and should not be understood to be exhaustive. The surface structures simplify the calibration of the orientation of the optical tools.

Particularly preferred is a further development in which the test plate has at least one, in particular at least two, particularly preferably at least four, recesses and/or protrusions with defined changes in height parallel to the stop axis. In other words, the recesses or protrusions are offset from reference surfaces of the test plate adjoining them, parallel to the stop axis. This enables the exact ascertainment of the orientation by angle-dependent measurement of the recesses and/or protrusions.

The test plate can have blank, in particular metallic blank, reference surfaces adjoining the recesses and/or protrusions. In other words, the reference surfaces have an uncoated surface. This increases the accuracy of the measurement of the recesses and/or protrusions by taking into account the reference surfaces and can thereby also increase the accuracy during the calibration of the orientation of the optical workpieces.

In one preferred further development, provision is made for the test plate to have at least one test scale with defined reference spacings. By measuring the defined reference spacings, it is possible to ascertain the orientation of an optical tool with particular accuracy.

Method

Embodiments of the present invention provide a method for calibrating a processing system with at least one light-emitting optical tool and at least one light-detecting optical tool by means of a calibration apparatus according to embodiments of the invention, which is described above. The method has the following method steps:

A) capturing light that is emitted by the light-emitting optical tool and is incident through the stop aperture using the sensor arrangement and setting a focal position of the light-emitting optical tool in accordance with the stop aperture;

B) capturing light emitted by the light source arrangement emitted through the stop aperture using the light-detecting optical tool and setting a focal position of the light-detecting optical tool in accordance with the stop aperture.

The focal positions of the light-emitting and of the light-detecting tools are preferably positioned (in advance) in close proximity of the stop aperture in a method step preceding method step A).

A light-emitting tool has at least one light-emitting element, wherein the emitted light serves for directly fulfilling the tool's purpose. Light-emitting tools are, for example, processing lasers and/or laser rangefinders.

A light-detecting tool has at least one light-detecting element, which enables an analysis of light that emanates in particular from a light-emitting and/or a light-reflecting surface. Light-detecting tools are, for example, thermal and/or optical cameras.

The light that is incident through the stop aperture is captured in method step A) by the sensor arrangement, in particular by a photodiode of the sensor arrangement. Typically, the light-emitting tool is moved over the stop aperture in accordance with a test pattern in a plane parallel to the stop aperture, that is to say perpendicular to the stop axis. The test pattern has in particular a plurality of test points with a defined deflection. With each deflection, light may be emitted in a defined manner by the light-emitting tool and the proportion of the light that is incident through the stop aperture may be captured. In other words, for each defined deflection, the quantity of light that is incident through the stop aperture is registered. In a non-calibrated state of the focal position, the result is an asymmetric distribution of the captured light over the test pattern, on the basis of which the focal position of the light-emitting tool can be set. The focal position can be calibrated parallel to the stop axis by displacing the light-emitting tool until the light intensity captured by the sensor arrangement reaches a maximum.

The focal position of the light-detecting tool can be set analogously to the preceding description. The light-detecting tool is moved perpendicular and/or parallel to the stop axis in accordance with a test pattern. For each deflection, the light emitted by the stop aperture can be captured by the light-detecting tool. The emitted light captured depends here on the deflected position of the light-detecting tool over the stop aperture. Based on the light that has been captured in dependence on the position, the focal position of the light-detecting tool can be set.

The test pattern preferably has at least nine, in particular at least 25, particularly preferably at least 81, defined deflections. In this way, the setting of the focal position can be particularly accurate. With further preference, the test pattern has the defined deflections in the direction of two, particularly preferably three, coordinate axes of the light-emitting tool. In other words, the defined deflections have an X-component and a Y-component and preferably a Z-component. In this way, the focal position can be set in the corresponding coordinate directions.

If the calibration apparatus has a test plate, the method can include the following further method steps:

C) marking a test mark on the test plate by way of the light-emitting tool;

D) checking the focal position of the light-emitting tool by capturing the test mark by means of the light-detecting optical tool.

The test plate preferably has at least one defined section for marking, preferably for laser engraving, a test mark. The defined region or regions preferably have no surface structures.

Method step C) is preferably carried out before and after method step A). In this case, a check can advantageously be carried out by determining the deviation between the two marked test marks.

The deviation between the test marks is preferably determined by the light-detecting tool, in particular a camera with an image processing system. In this way, the optical tools of the processing system can be advantageously used for mutual control.

If the test plate has surface structures, the following further method steps can be provided:

E) deflecting the light-detecting optical tool in a defined manner;

F) measuring at least one of the surface structures by way of the light-detecting optical tool;

G) comparing the measured values with stored reference values;

H) orienting the light-detecting tool on the basis of the deviation between the measured values and reference values.

Method steps E) to H) are preferably performed after the focal position of the light-detecting tool has been set. Advantageously with regard to the accuracy of the calibration of the orientation, said calibration can thus be carried out starting from a common reference point.

Method steps E) to G) and, if necessary, H) are preferably carried out repeatedly. In this way, the accuracy of the calibration can be further improved.

For measuring the surface structures, light reflected by the surface structures can be captured by the light-detecting tool and subsequently be evaluated. For the purposes of evaluation, provision may be made for the light-detecting tool to have evaluation means, in particular software. For example, the light-detecting tool can have a camera and an image processing system for measuring images recorded by the camera.

For better capturing the light reflected by the surface structures, provision may be made for the light-detecting tool to have a light-emitting element for emitting light. For example, a camera can have an exposure element for improving the image quality.

Processing System

Embodiments of the invention provide a processing system with a calibration apparatus according to embodiments of the invention as described above and with a plurality of optical tools. The plurality of optical tools can be calibrated by using the one calibration apparatus such that a common focal position and defined orientations in relation to one another, in particular parallel optical axes, are established. This can be accomplished using the method according to embodiments of the invention as described above.

The processing system can have at least one light-detecting optical tool and at least one light-emitting optical tool. The optical tools are preferably arranged at a common processing head of the processing system. If the optical tools are moved jointly via the processing head, their focal positions in relation to one another remain unchanged.

Further advantages of the invention are evident from the description and the drawing. According to embodiments of the invention, the features mentioned above and those still to be further presented can be used in each case individually or together in any desired expedient combinations. The embodiments shown and described should not be understood as an exhaustive list, but rather are of an exemplary character for elucidating the invention.

FIG. 1 shows a calibration apparatus 10 according to embodiments of the invention with a housing 12 having a stop aperture 14.

The housing 12 is arranged here centrally on a test plate 16. To this end, the test plate 16 in the present case has a housing cutout 18 through which a housing protrusion 20 of the housing 12 engages. To arrange the test plate 16 on the housing 12 so that the former is secured against rotation, the housing 12 has a centring pin 22 arranged in a centring cutout 24 of the test plate 16. The test plate 16 is removable from the housing 12 to enable easy exchange of the test plate 16.

The test plate 16 has a plurality of surface structures in the form of test marks 26, recesses 28, reference surfaces 30 and test scales 32. Except for the surface structures, a surface of the test plate 16 can be coated, in particular eloxated. The coating can be designed in colourful or non-colourful colours, for example black.

The test marks 26 are produced on the test plate 16 by a light-emitting tool (not shown), in particular a laser. The test marks 26 can be produced before, during and/or after calibration and serve for checking the focal position of the light-emitting tool.

The recesses 28 each have a blank (non-eloxated) base surface and blank (non-eloxated) side surfaces.

The test scales 32 are configured in the form of blank surfaces having defined spacings.

Figure 2:
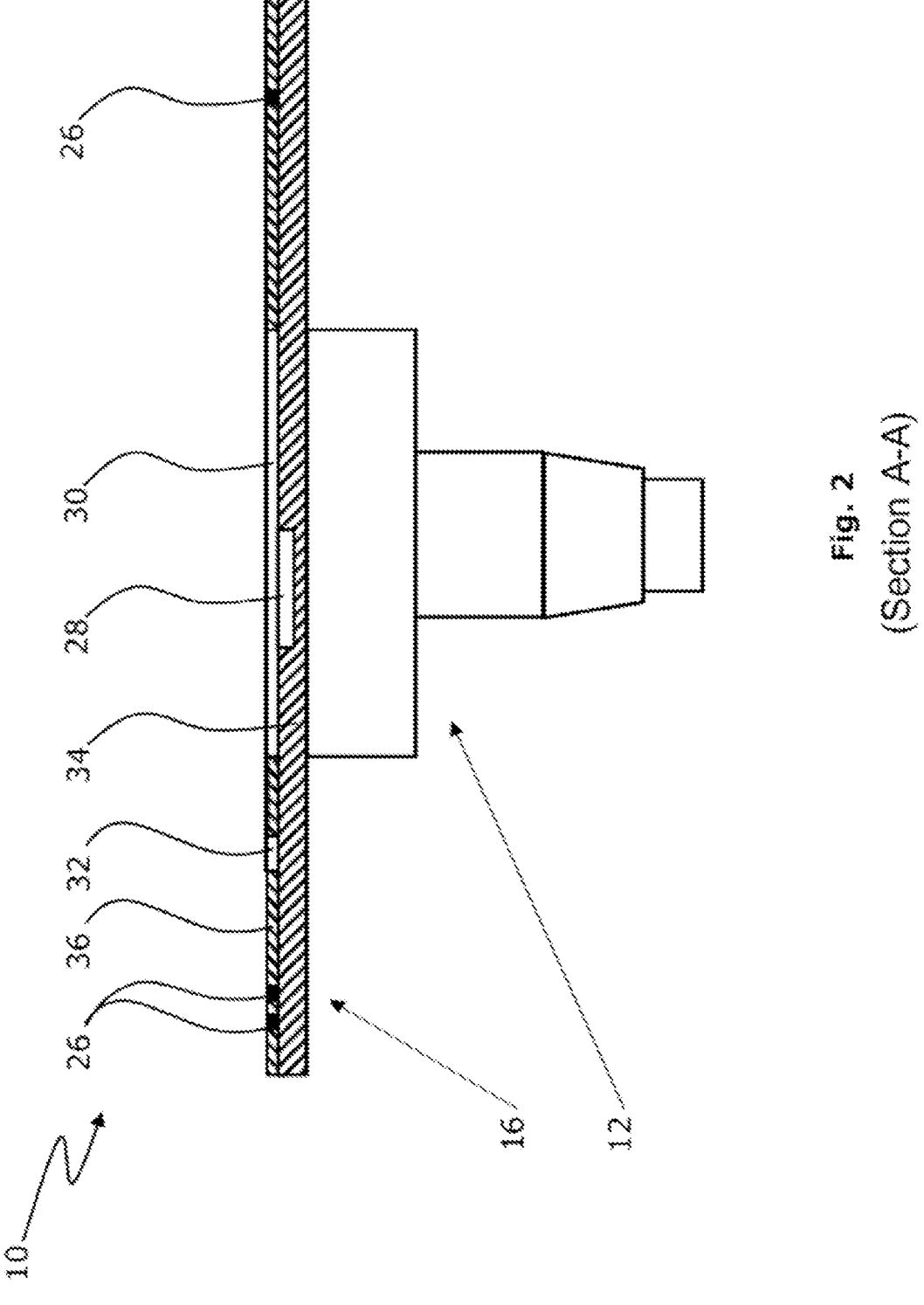
FIG. 2 shows a schematic sectional view along the sectional line A-A through the calibration apparatus from FIG. 1.

FIG. 2 shows the calibration apparatus 10 with the housing 12 and the test plate 16 in a side view. For the purposes of providing a better explanation, the test plate 16 is shown sectioned along the sectional line A-A (cf. FIG. 1).

In the present case, the test plate 16 has a carrier plate 34 and an eloxated layer 36. The eloxated layer 36 serves for optically differentiating between surface structures and regions of the test plate 16, which are provided for the production of the test marks 26 by way of an optical tool (not shown).

Figure 3:
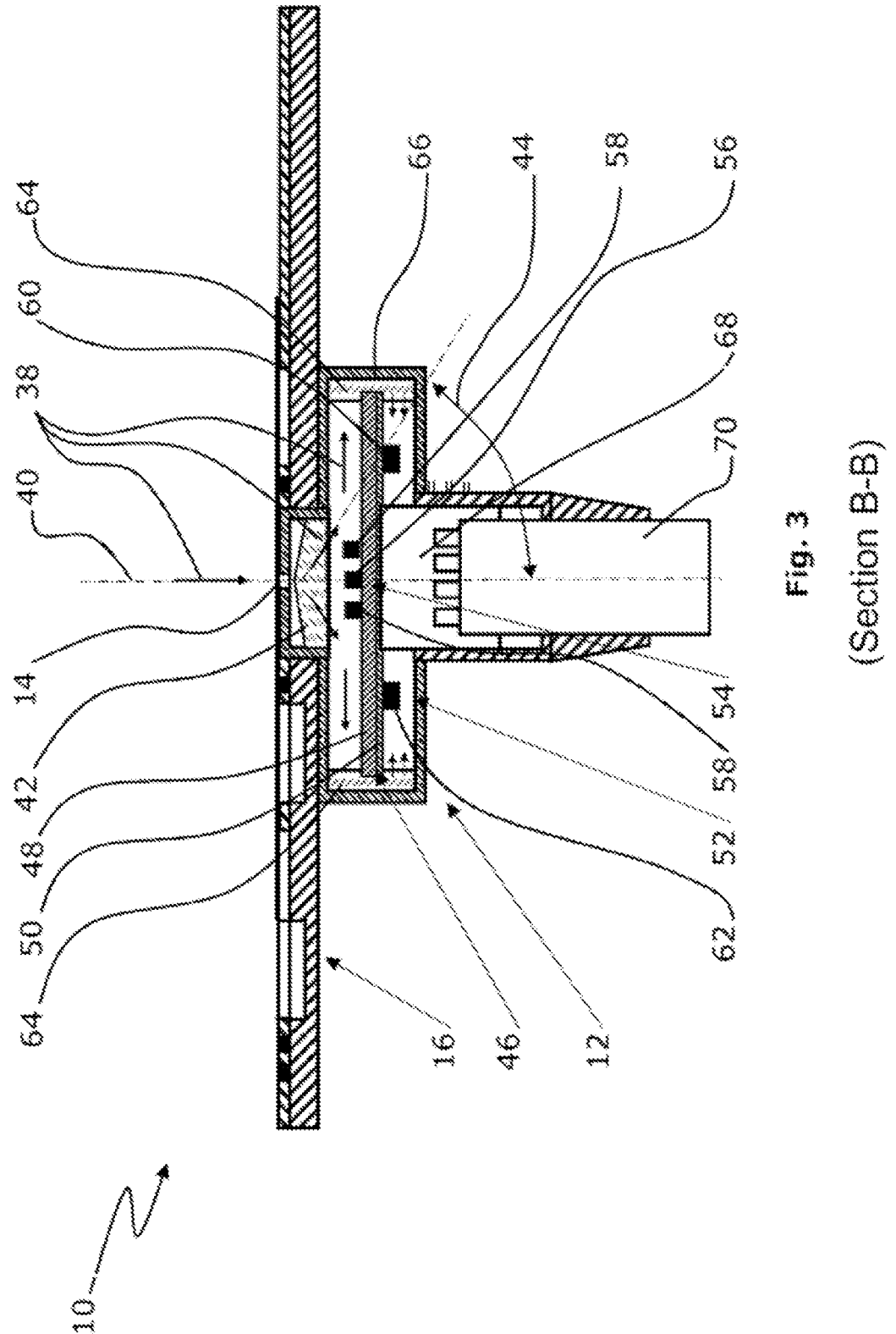
FIG. 3 shows a schematic sectional view along the sectional line B-B through the calibration apparatus from FIG. 1.

FIG. 3 shows a side view of the calibration apparatus 10. For the purposes of providing a better explanation, the housing 12 and the test plate 16 is shown sectioned along the sectional line B-B (cf. FIG. 1).

Light 38 travels into the housing 12 through the stop aperture 14 along a stop axis 40. An optical element 42 is arranged below the stop aperture 14 in the housing 12. The optical element 42 deflects the incident light 38 by an angle 44 away from the stop axis 40.

A circuit board 46 with a carrier plate 48 and a conductor track layer 50 is arranged below the optical element 42 in the housing 12. The circuit board 46 carries a sensor arrangement 52 and a light source arrangement 54.

The light source arrangement 54 is arranged on the side of the circuit board 46 or the carrier plate 48 facing the stop aperture 14. In the present case, the light source arrangement 54 has a first light source 56 and two second light sources 58. The first and the second light sources 56, 58 are designed as light-emitting diodes.

The first light source 56 is designed to emit infrared light having a wavelength of 1550 nm, for example. The first light source 56 can be arranged along the stop axis 40 between the optical element 42 and the carrier plate 48 of the circuit board 46. In other words, the first light source 56 is arranged on the stop axis 40 of the stop aperture 14. The emission direction of the first light source 56 is towards the stop aperture 14. In this way, the infrared light emitted by the first light source 56 can be radiated particularly directly through the stop aperture 14.

The second light sources 58 are arranged on the carrier plate 48 at a radial distance from the stop axis 40 and emit red light having a wavelength of 645 nm, for example. The second light sources 58 are preferably arranged on the carrier plate 48 uniformly and according to the contour of the stop aperture 14. For example, the second light sources 58 are arranged in the shape of a circle if the stop aperture 14 is round. The number of the second light sources 58 preferably increases as the radial distance from the stop axis 40 increases in order to uniformly light the stop aperture 14. The second light sources 58 are preferably oriented parallel to the stop axis 40.

It is likewise conceivable that a second light source 58 is arranged along the stop axis 40 on the carrier plate 48 and the first light source 56 is arranged at a radial distance from the stop axis 40. Accordingly, the preceding description should be understood to be analogous.

By diverting the light 38 that is incident through the stop aperture 14 using the optical element 42, the light source arrangement 54 is protected against the light intensity of the incident light 38. In other words, the optical element 42 steers the incident light 38 past the light source arrangement 54.

The optical element 42 redirects infrared and/or red light emitted by the light source arrangement 54 in the opposite direction towards the stop aperture 14. In other words, the function of the optical element 42 depends on the direction from which it is irradiated. In particular, the optical element can steer light emitted by the two second light sources 58 onto the stop aperture.

The sensor arrangement 52 is arranged on the side of the circuit board 46 or the conductor track layer 50 facing away from the stop aperture 14. The sensor arrangement 52 here has a photodiode 60 and a temperature sensor 62.

The photodiode 60 is configured to capture the light intensity of the light 38 that is incident through the stop aperture 14. In the present case, the photodiode 60 is arranged on the side of the circuit board 46 facing away from the stop aperture 14 in order to reduce the light intensity of the light 38 that is to be captured to a range that is measurable by the photodiode. In other words, the light intensity of the light 38 upon incidence through the stop aperture 14 is too high and must be reduced before it is captured.

For this purpose, the housing 12 has a light-guiding element that is embodied in the present case in the form of a light-guiding sleeve 64. The light-guiding sleeve 64 is arranged between the periphery of the circuit board 46 and a side wall 66 of the housing 12. For the purpose of improved light guiding, the light-guiding sleeve 64 extends both into the region of the housing 12 facing the stop aperture 14 and also into the region of the housing 12 facing away from the stop aperture 14.

Incident light 38 that is diverted by the optical element 42 is guided from the side of the circuit board 46 facing the stop aperture 14 to the side facing away from the stop aperture 14 by means of the light-guiding sleeve 64. In order to decrease the light intensity, the light-guiding element has decreased light transmission. The light transmission of the light-guiding element is adaptable to the light intensity of the incident light 38. In other words, some of the incident light 38 is absorbed in the light-guiding element.

The light-guiding sleeve 64 in the present case is formed to hold the circuit board 46. For this purpose, the light-guiding sleeve 64 has a radially circumferential groove gripping the circuit board 46.

A plug connector 68 for establishing a data and current connection 70 is arranged at the circuit board 46.

Figure 4:
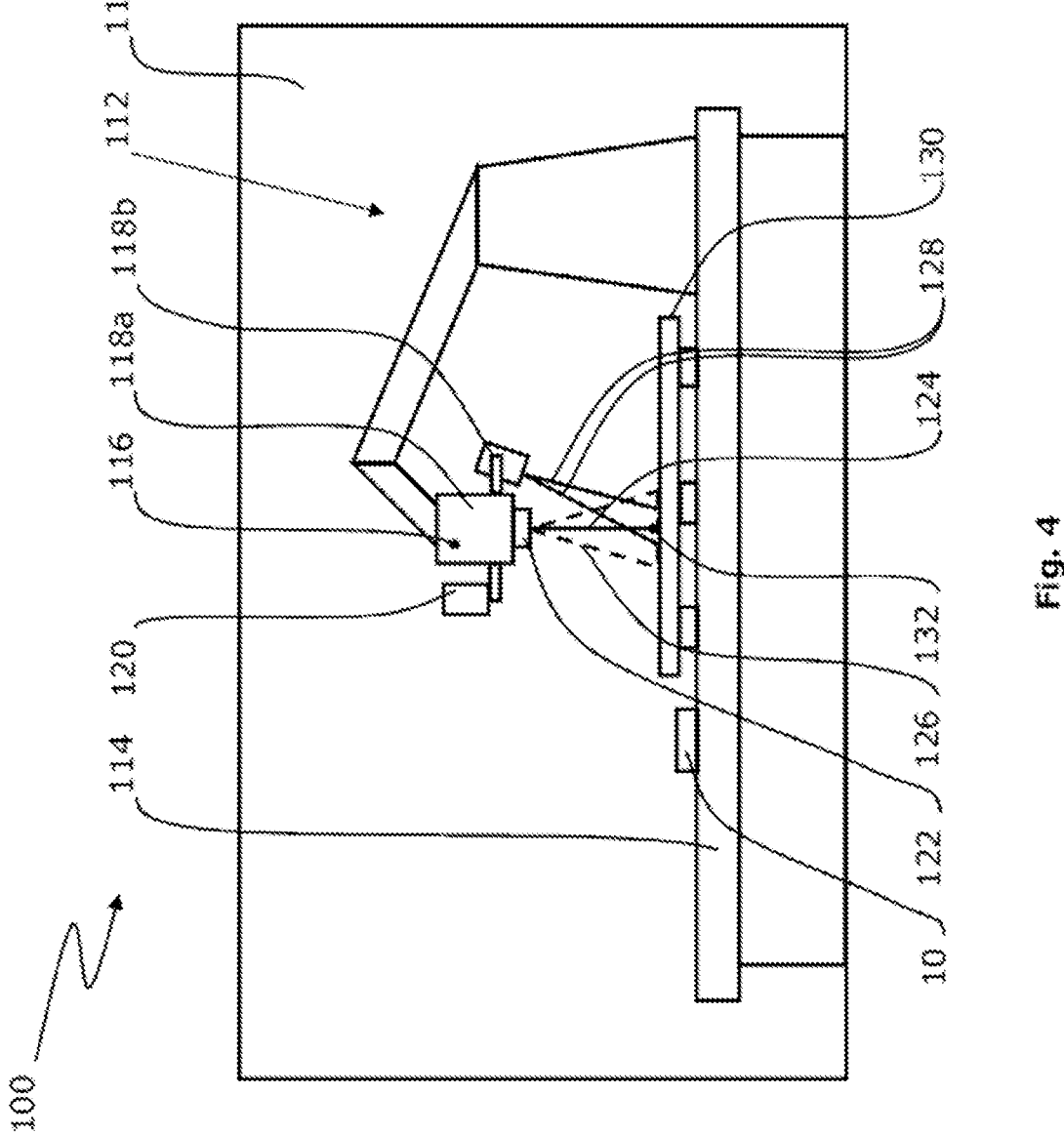
FIG. 4 shows a processing system with a plurality of optical tools in a schematic illustration according to some embodiments.

FIG. 4 shows a processing system 100 with a processing machine 112 arranged within a processing space 110.

The processing machine 112 is arranged on a processing table 114 and has a processing head 116. The processing head 116 in the present case comprises three optical tools, specifically two light-emitting tools and one light-detecting tool.

In the embodiment illustrated, the light-emitting tools are a processing laser 118*a* and a measuring laser 118*b*. The light-detecting tool is here a camera 120.

The processing laser 118*a* and the camera 120 have a common focusing optical unit 122. This enables the joint alignment of a laser beam 124 and of a camera image 126. The measurement laser 118*b* has two line lasers 128 for measuring a workpiece 130 in front of and behind a weld seam produced by the laser beam 124.

The optical tools of the processing head 116 have a common focal position 132. In order to perform a calibration method described below for establishing the common focal position 132, the processing head 116 can be moved into a position above the calibration apparatus 10.

Figure 5:
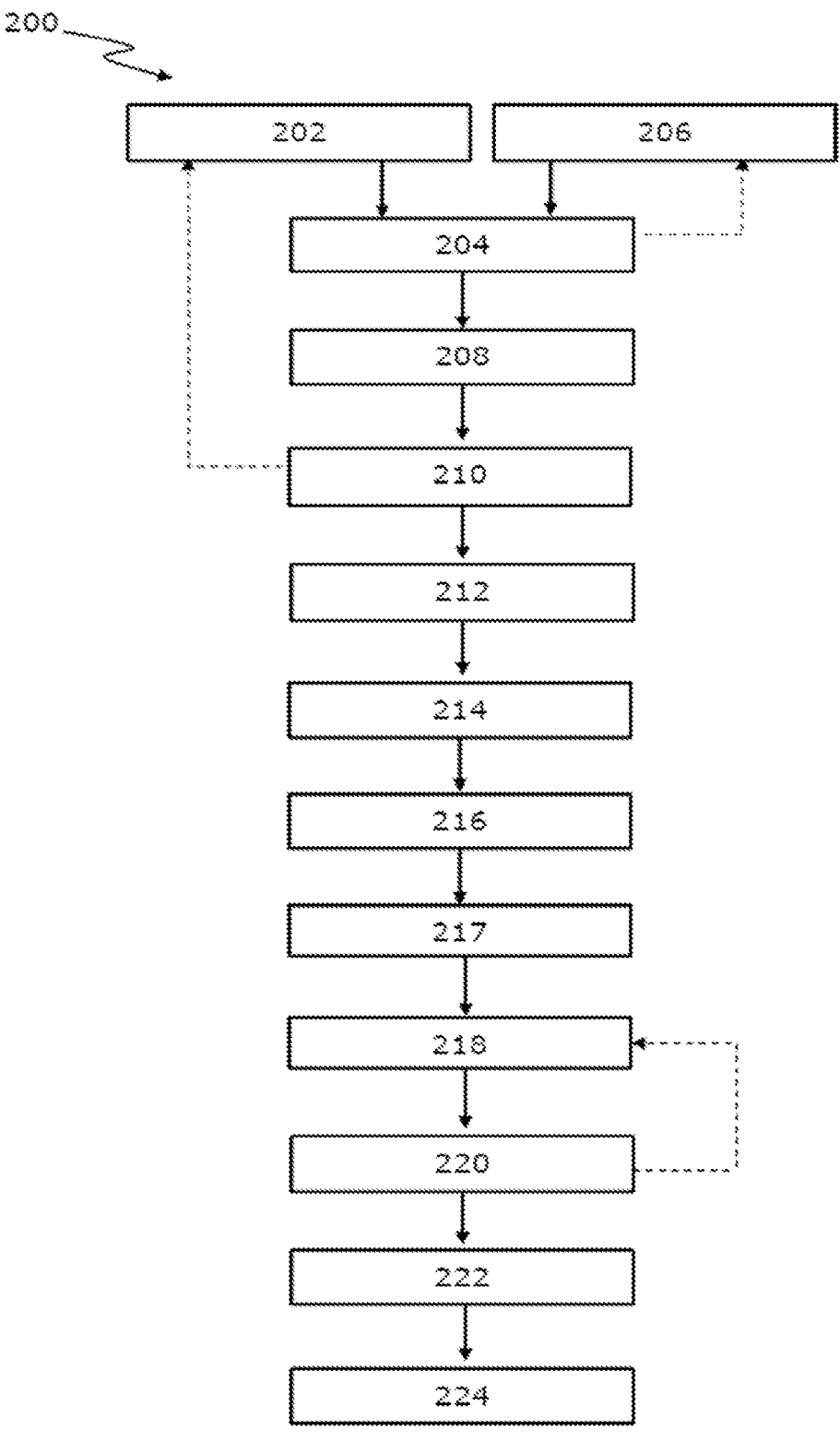
FIG. 5 shows a flowchart of a method according to some embodiments.

FIG. 5 shows a schematic method sequence of a method according to embodiments of the invention for calibrating a processing system. The method can be carried out on the processing system 100 (cf. FIG. 4) using the calibration apparatus 10 (cf. FIGS. 1 to 3).

In a method step 202, the non-calibrated processing head 116 is positioned roughly above the calibration apparatus 10. The theoretical focal position (that would be expected in the ideal case) of the optical tools of the processing head 116 should here coincide with the stop aperture 14.

Next, in a method step 204, light is emitted in a defined manner by a light-emitting tool, in particular a processing laser 118*a* or a measuring laser 118*b*, towards the stop aperture 14, and the light 38 that is incident through the stop aperture 14 is captured by the sensor arrangement 52.

In a method step 206, the light-emitting tool is preferably deflected in a defined manner, in particular repeatedly. The method step 204 is repeated with each defined deflection. The number and absolute value and direction of the deflections can be determined here by a test pattern.

After steps 204 and 206 have been performed, the actual focal position 132 of the light-emitting tool is ascertained in a method step 208. The actual focal position 132 can be determined from the proportion of the light that is actually captured to light that is theoretically capturable for each defined deflection. For example, the proportion of the light 38 that is actually captured in the event of an ideal (coinciding) actual focal position 132 above the stop aperture 14 can be 100% of the emitted light.

In a method step 210, the actual focal position of the light-emitting tool is set in accordance with the desired focal position, in particular with the stop aperture 14. Here, the theoretical focal position of the optical tool is corrected by the deviation from the ascertained focal position.

To check the focal position that has been calibrated in this way, provision may be made in the end for the method steps 202 to 208 to be repeated.

Provision may furthermore be made for the focal position of the light-emitting optical tool to be checked by a light-detecting optical tool. In this case, a test mark 26 is marked, in particular permanently, on the test plate 16 by the light-emitting optical tool. The test mark 26 is then captured by the light-detecting optical tool and checked for deviations from a reference. In particular, a reference can be in the form of a test mark 26 that was marked before the light-emitting optical tool was calibrated.

A focal point corresponding to the set focal position of the light-emitting optical tool is then made to coincide with the stop aperture 14 in a method step 212. The subsequent calibration of further optical tools is then effected in relation to the calibrated light-emitting tool. The optical tools of the processing head 116 can thus be set in accordance with a common focal position.

In a subsequent method step 214, light is emitted by the light source arrangement 54 of the calibration apparatus 10 and radiated through the stop aperture 14. The emitted light is captured by a light-detecting tool to be calibrated, in particular a camera 120.

In a method step 216, the actual focal position of the light-detecting optical tool is ascertained on the basis of the captured light. Preferably, an image presentation of the stop aperture 14 is generated here by the light-detecting tool and the actual focal position is ascertained by determining the illuminated stop aperture 14 in the image presentation. In particular, the actual focal position can be determined by way of the position deviation of the stop aperture 14 from a centre of the image presentation. With corresponding correction, the focal position of the light-detecting tool can be set in a step 217.

Furthermore, provision may be made for the ascertainment of the actual focal position to be effected in a manner that is analogous to method steps 204 to 208 for the light-detecting tool to be calibrated.

After the calibration of the focal positions of the optical tools of the processing head 116, an orientation, for example in the case of rotation and/or tilting, of the optical tools can be calibrated.

For this purpose, at least one of the optical tools, in particular a light-detecting optical tool, can be deflected in a defined manner from its focal position in a method step 218. Next, in a method step 220, a defined surface structure, in particular a geometrically defined surface structure, is measured from the deflected position by the optical tool. The resulting measured value is consequently dependent on the actual orientation, for example tilt, of the optical tool. Preferably, method steps 218 and 220 are carried out repeatedly, in particular in accordance with a predefined scheme.

In a subsequent method step 222, the measured values are compared with stored reference values for a correct orientation of the optical tool, and in a method step 224, the orientation of the optical tool is set in accordance with the deviation between the measured value and the reference value.

All the figures together show that embodiments of the invention relate to an apparatus 10 for calibrating a plurality of optical tools of a processing machine 112 to a common focal position 132. The apparatus 10 has light sensors 60, 62 and light sources 56, 58 for capturing and emitting light 38 through a stop aperture 14 of a stop. Embodiments of the present invention furthermore relate to a processing system 100 having such an apparatus 10 and a plurality of optical tools. Embodiments of the invention also relate to a method 200 for calibrating light-emitting and light-detecting optical tools by means of such an apparatus 10.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 calibration apparatus;
12 housing;
14 stop aperture;
16 test plate;
18 housing cutout in the test plate 16;
20 housing protrusion of the housing 12;
22 centring pin of the housing 12;
24 centring cutout in the test plate 16;
26 test mark;
28 recesses;
30 reference surfaces;
32 test scales;
34 carrier plate;
36 eloxated layer;
38 light incident through the stop aperture 14;
40 stop axis;
42 optical element;
44 angle;
46 circuit board;
48 carrier plate;
50 conductor track layer;
52 sensor arrangement;
54 light source arrangement;
56 first light source;
58 second light source;
60 photodiode;
62 temperature sensor;
64 light-guiding sleeve;
66 side wall of the housing 12;
68 plug connector;
70 data and current connection;
100 processing system;
110 processing space;
112 processing machine;
114 processing table;
116 processing head of the processing machine 112;
118a processing laser;
118b measuring laser;
120 camera;

122 focusing optical unit;
124 laser beam;
126 camera image;
128 measuring laser beams;
130 workpiece;
132 focal position;
200 method;
202 positioning of processing head 116;
204 emitting light by way of a light-emitting tool and capturing the light that is incident through the stop aperture;
206 deflecting the light-emitting tool in a defined manner;
208 ascertaining the focal position of the light-emitting tool;
210 setting the light-emitting tool;
212 positioning a focal point over the stop aperture 14;
214 emitting light by way of the light source arrangement 54;
216 ascertaining the focal position by way of the light-detecting tool;
217 setting the focal position of the light-detecting tool;
218 deflecting a light-detecting tool;
220 measuring a surface structure by way of the light-detecting tool;
222 comparing the measured values with stored reference values;
224 orienting the light-detecting tool.

The invention claimed is:

1. A processing system comprising:
a plurality of optical tools, the plurality of optical tools including a light-emitting tool and a light-detecting tool, wherein the light-emitting tool and the light-detecting tool comprise a common focusing optical unit, and
a calibration apparatus comprising:
a housing with a stop aperture, a position of the stop aperture coinciding with a theoretical focal position of the light-emitting tool and a theoretical focal position of the light-detecting tool,
a sensor arrangement for capturing light that is emitted by the light-emitting tool and is incident through the stop aperture, and
a light source arrangement for emitting light through the stop aperture to be detected by the light-detecting tool,
wherein the processing system is configured to calibrate an actual focal position of the light-emitting optical tool and an actual focal position of the light-detecting tool by:
capturing light that is emitted by the light-emitting optical tool and is incident through the stop aperture using the sensor arrangement, and setting the actual focal position of the light-emitting optical tool in accordance with the stop aperture; and
capturing light that is emitted by the light source arrangement and is emitted through the stop aperture using the light-detecting optical tool, and setting the actual focal position of the light-detecting optical tool in accordance with the stop aperture.

2. The processing system according to claim 1, wherein the calibration apparatus further comprises a circuit board that is arranged in the housing, wherein the light source arrangement and/or the sensor arrangement are disposed on the circuit board.

3. The processing system according to claim 2, wherein the sensor arrangement is arranged on a side of the circuit board facing away from the stop aperture, and the calibration apparatus further comprises a light-guiding structure for guiding the light incident through the stop aperture to the sensor arrangement.

4. A calibration apparatus for a processing system with a plurality of optical tools, the plurality of optical tools including a light-emitting tool and a light-detecting tool, wherein the light-emitting tool and the light-detecting tool comprise a common focusing optical unit, the calibration apparatus comprising:

a housing with a stop aperture, a position of the stop aperture coinciding with a theoretical focal position of the light-emitting tool and a theoretical focal position of the light-detecting tool, a sensor arrangement for capturing light that is emitted by the light-emitting tool and is incident through the stop aperture, thereby enabling calibration of an actual focal position of the light-emitting tool, a light source arrangement for emitting light through the stop aperture to be detected by the light-detecting tool, thereby enabling calibration of an actual focal position of the light-detecting tool, a circuit board that is arranged in the housing, wherein the light source arrangement and/or the sensor arrangement are disposed on the circuit board, a light-guiding structure for guiding the light incident through the stop aperture to the sensor arrangement, wherein the light-guiding structure comprises a light-transmissive sleeve, and wherein the circuit board is held in the housing via the light-transmissive sleeve.

5. The processing system according to claim 2, wherein the calibration apparatus further comprises an optical element arranged between the stop aperture and the circuit board, wherein the optical element is configured for redirecting light that is incident through the stop aperture.

6. The processing system according to claim 1, wherein the sensor arrangement comprises a photodiode and/or a temperature sensor.

7. The processing system according to claim 1, wherein the light source arrangement comprises at least a first light source, wherein the first light source is configured for emitting light having a wavelength of at least 760 nm.

8. The processing system according to claim 7, wherein the light source arrangement comprises a second light source, wherein the second light source is configured for emitting light having a wavelength of at most 760 nm.

9. The processing system according to claim 1, wherein the calibration apparatus further comprises a test plate extending orthogonally to a stop axis of the stop aperture, wherein the test plate has a surface that is regionally coated.

10. The processing system according to claim 9, wherein the test plate comprises defined surface structures for calibrating the plurality of optical tools.

11. The processing system according to claim 9, wherein the test plate has at least one recess and/or at least one protrusion with a defined change in height parallel to the stop axis.

12. The processing system according to claim 11, wherein the test plate has blank reference surfaces adjoining the at least one recess and/or the at least one protrusion.

13. The processing system according to claim 9, wherein the test plate comprises at least one test scale with defined reference spacings.

14. A method for calibrating a processing system with at least one light-emitting optical tool and at least one light-detecting optical tool, wherein the light-emitting tool and the light-detecting tool comprise a common focusing optical unit, the method comprising:

providing a calibration apparatus, the calibration apparatus comprising:

a housing with a stop aperture, a position of the stop aperture coinciding with a theoretical focal position of the light-emitting tool and a theoretical focal position of the light-detecting tool, a sensor arrangement for capturing light that is emitted by the light-emitting tool and is incident through the stop aperture, and a light source arrangement for emitting light through the stop aperture to be detected by the light-detecting tool, capturing light that is emitted by the light-emitting optical tool and is incident through the stop aperture using the sensor arrangement, and setting a focal position of the light-emitting optical tool in accordance with the stop aperture; and capturing light that is emitted by the light source arrangement and is emitted through the stop aperture using the light-detecting optical tool, and setting a focal position of the light-detecting optical tool in accordance with the stop aperture.

15. The method according to claim 14, wherein the calibration apparatus comprises a test plate, the method further comprising:

marking a test mark on the test plate using the light-emitting tool; and checking the focal position of the light-emitting tool by capturing the test mark using the light-detecting optical tool.

16. The method according to claim 14, wherein the calibration apparatus comprises a test plate extending orthogonally to a stop axis of the stop aperture and comprising defined surface structures, the method further comprising:

deflecting the light-detecting optical tool in a defined manner;

measuring at least one of the surface structures using the light-detecting optical tool;

comparing measured values with stored reference values; and orienting the light-detecting tool based on deviations between the measured values and the reference values.

* * * * *